United States Patent
Spencer et al.

(10) Patent No.: US 10,782,742 B1
(45) Date of Patent: Sep. 22, 2020

(54) ELECTRONIC DEVICE THAT USES AIR PRESSURE TO REMOVE LIQUID

(71) Applicant: Apple Inc., Cupertino, CA (US)

(72) Inventors: Maegan K. Spencer, La Honda, CA (US); Ryan C. Perkins, San Francisco, CA (US); Shannon X. Yang, Sunnyvale, CA (US); Erik G. De Jong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 90 days.

(21) Appl. No.: 16/103,827

(22) Filed: Aug. 14, 2018

(51) Int. Cl.
*G06F 1/16* (2006.01)
*F16K 31/12* (2006.01)

(52) U.S. Cl.
CPC ............ *G06F 1/1656* (2013.01); *F16K 31/12* (2013.01); *G06F 1/163* (2013.01)

(58) Field of Classification Search
CPC ...... G04G 17/08; G04G 17/083; G06F 1/163; G06F 1/1656; H04M 1/18
See application file for complete search history.

(56) References Cited

U.S. PATENT DOCUMENTS

| | | | |
|---|---|---|---|
| 6,461,125 B1 * | 10/2002 | Terasawa | F04B 33/00 224/164 |
| 6,625,900 B1 | 9/2003 | Tobias | |
| 6,648,502 B2 * | 11/2003 | Oomori | A44C 5/00 368/276 |
| 6,975,305 B2 * | 12/2005 | Yamashita | G06F 3/041 178/18.01 |
| 8,408,785 B2 * | 4/2013 | Hiranuma | G04B 37/02 368/291 |
| 9,167,065 B2 * | 10/2015 | Mikami | H04M 1/18 |
| 9,683,780 B2 | 6/2017 | Zielinski et al. | |
| 9,829,249 B2 | 11/2017 | Tice | |
| 9,841,234 B2 | 12/2017 | Stahl | |
| 9,939,783 B2 * | 4/2018 | Hilario | G04B 37/00 |
| 10,006,714 B2 | 6/2018 | Schmidt et al. | |
| 10,056,205 B2 | 8/2018 | Hegde et al. | |
| 10,197,330 B2 | 2/2019 | Stewart | |
| 10,206,470 B2 | 2/2019 | Fathollahi et al. | |
| 10,246,240 B1 | 4/2019 | Sadaghiani | |

(Continued)

FOREIGN PATENT DOCUMENTS

WO      2017149171 A1     9/2017

*Primary Examiner* — Anthony Q Edwards
(74) *Attorney, Agent, or Firm* — Dickinson Wright RLLP

(57) ABSTRACT

An electronic device is disclosed. The electronic device may include a sensing component positioned in an enclosure. The sensing component can determine ambient air pressure. In order for the sensing component to access ambient air, the electronic device includes a through hole in the enclosure. The through hole allows communication from the ambient air to the sensing component. In some instances, liquid becomes lodges in the through hole and reduces or inhibits the ability of the sensing component to determine the ambient air pressure. In order to expel the liquid from the through hole, the electronic device may include an air accumulation module designed to receive air from the internal volume, causing an increased air pressure within the air accumulation module. The air accumulation module can subsequently release the air in a direction toward the through hole. In this manner, the air can expel the liquid from the through hole.

20 Claims, 14 Drawing Sheets

(56) References Cited

U.S. PATENT DOCUMENTS

| | | |
|---|---|---|
| 10,327,348 B2 | 6/2019 | Wright et al. |
| 10,337,794 B2 | 7/2019 | Barrows |
| 10,345,042 B2 | 7/2019 | Mestanek et al. |
| 10,436,471 B2 | 10/2019 | Williams et al. |
| 10,473,396 B2 | 11/2019 | Tice |
| 10,531,586 B2 * | 1/2020 | Yoon .................. H04M 1/18 |
| 2009/0145783 A1 | 6/2009 | Forker |
| 2014/0160680 A1 | 6/2014 | Stevens |
| 2015/0163572 A1 * | 6/2015 | Weiss .................. H04R 1/02 |
| | | 381/337 |
| 2015/0293591 A1 * | 10/2015 | Yairi .................. G06F 3/0416 |
| | | 345/173 |
| 2015/0319534 A1 * | 11/2015 | Lippert .................. H04R 1/023 |
| | | 381/165 |
| 2015/0331525 A1 * | 11/2015 | Yairi .................. F04B 43/113 |
| | | 345/173 |
| 2016/0037243 A1 * | 2/2016 | Lippert .................. H04R 1/023 |
| | | 381/166 |
| 2017/0086321 A1 * | 3/2017 | de Jong .................. H05K 5/0213 |
| 2017/0157573 A1 * | 6/2017 | Mori .................. H04R 1/023 |
| 2018/0084324 A1 * | 3/2018 | Vitt .................. H04R 1/023 |
| 2018/0206354 A1 * | 7/2018 | Yoon .................. H04M 1/18 |
| 2019/0072903 A1 * | 3/2019 | Park .................. G04B 37/08 |
| 2019/0150754 A1 * | 5/2019 | Naik .................. A61B 5/02108 |
| 2019/0383686 A1 * | 12/2019 | Ten Kate .................. G01L 19/0046 |
| 2020/0025406 A1 | 1/2020 | Williams et al. |
| 2020/0080775 A1 | 3/2020 | Argyres et al. |

\* cited by examiner

ELECTRONIC DEVICE THAT USES AIR PRESSURE TO REMOVE LIQUID

FIELD

The following description relates to electronic devices. In particular, the following description relates to electronic devices with liquid ejection features designed to expel liquid that because lodged or otherwise positioned in an opening of the electronic device. Electronic devices can create an air pressure buildup, within a housing of the electronic device, to expel the liquid.

BACKGROUND

Modern portable electronic devices provide several new functions and features. For example, an electronic device may include a sensor that communicates with the external environment. The sensor allows the electronic device to enable fitness-related applications.

In order to provide these features, the sensor requires access to ambient air outside of the electronic device. As a result, the electronic device may include one or more ports, or openings, in the housing. However, the ports render the electronic device vulnerable to water ingress, which can distort or prevent use of the sensor.

SUMMARY

In one aspect, a wearable electronic device is described. The wearable electronic device may include an enclosure that includes a through hole. The wearable electronic device may further include a transparent layer coupled with the enclosure. The transparent layer and the enclosure can define an internal volume. The wearable electronic device may further include an air accumulation module positioned in the internal volume and in communication with the through hole. The air accumulation module may include a first valve that receives at least some air in the internal volume when a force moves the transparent layer to reduce the internal volume and increase air pressure of the air in the internal volume. The air accumulation module may further include a chamber that stores the air received by the first valve. The air accumulation module may further include a second valve capable of expelling the air stored in the chamber into the through hole.

In another aspect, a wearable electronic device is described. The wearable electronic device may include an enclosure that defines an internal volume. The enclosure may include a sidewall having a through hole. The wearable electronic device may further include a first band and a second band. The first band and the second band can be coupled to the enclosure. In some embodiments, the first band combines with the second band to form a loop that secures the enclosure with a user. The wearable electronic device may further include a sensing component positioned in the internal volume and capable of determining ambient air pressure via the through hole. The wearable electronic device may further include an air accumulation module positioned in the internal volume. The air accumulation module may include a first valve capable of receiving the air from the internal volume. The air accumulation module may further include a chamber that stores the air received by the first valve. The air accumulation module may include a second valve capable of expelling the air within the chamber such that the air passes through the through hole and expels a liquid.

In another aspect, a method for expelling a liquid from a wearable electronic device is described. The wearable electronic device may include an enclosure having a through hole. The method may include receiving a force at a transparent layer of the wearable electronic device. The method may further include providing air, based on receiving the force at the transparent layer, from an internal volume, defined by the enclosure and the transparent layer, into an air accumulation module of the wearable electronic device. The method may further include expelling at least some of the air from the air accumulation module that causes a liquid to exit the through hole.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
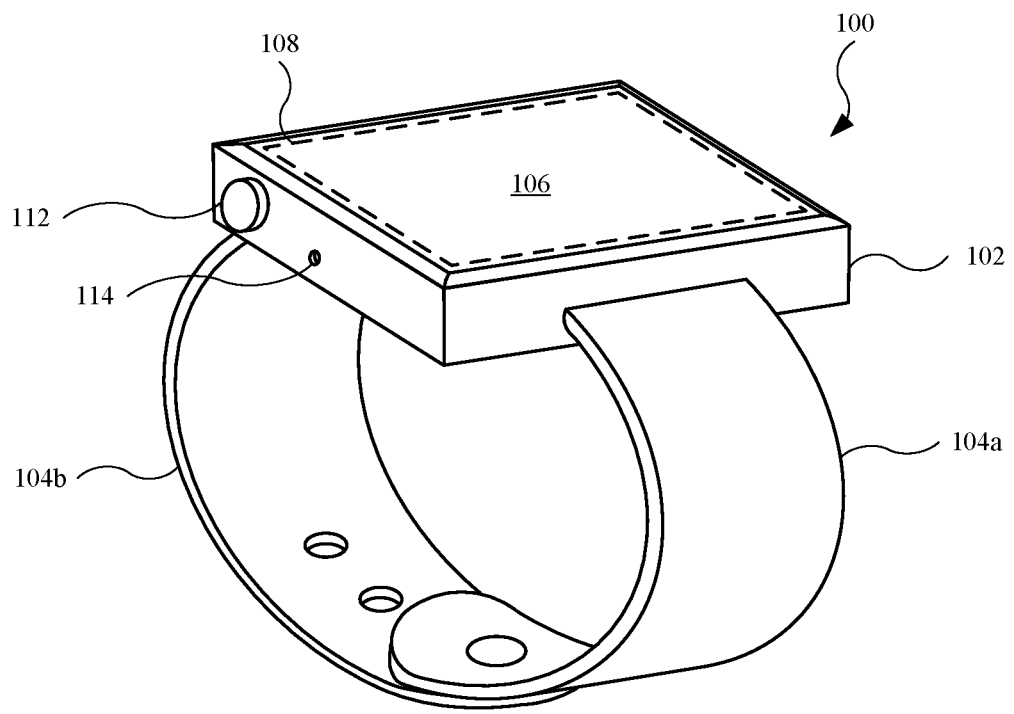
FIG. 1 illustrates an isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to electronic devices capable of expelling liquid from a through hole, or port, of the electronic device. The liquid or contaminant may block the through hole, thereby limiting access by components (microphones, barometric pressure sensors, speaker modules, as non-limiting examples) of the electronic device to the ambient environment outside of the electronic. The through hole may refer a void in an enclosure of the electronic device, with the enclosure providing a housing for the components. In order to expel the liquid, the electronic device may incorporate a valve or an air accumulation module, both of which are designed to release air into the through hole subsequent to a buildup of air pressure in the electronic device. User interaction, such providing a touch input to a display assembly of the electronic device) can initiate pressure buildup. For example, when the user provides a touch input to the display assembly, the user contacts a transparent layer (or transparent protective cover), causing the transparent layer to move toward the enclosure. As a result, the internal volume, defined by the transparent layer and the enclosure, is reduced, which reduces the volume of air in the internal volume and causes a corresponding increase in air pressure.

In the case of the valve, the valve remains closed until the air pressure increases and forces the valve opening, and the air is subsequently released through the valve an increased pressure relative to ambient air pressure outside the electronic device. The increased air pressure provides a force to expel the liquid. In the case of the air accumulation module, the air accumulation module includes a first valve, a second valve, and a chamber. The first value is designed to open when the air pressure in the electronic device increases by, for example, the aforementioned user interaction, and air enters the chamber. However, the second valve remains closed and the air is stored in the chamber. The air remains stored until multiple user interactions cause multiple instances of the first valve opening and air subsequently entering chamber. As the internal air pressure in the chamber increases through the multiple instances of air entry, the internal air pressure reaches (or exceeds) an air pressure that causes the second valve to open and release the air from the second valve, and the air directed to the through hole and provides a force capable of expelling liquid from the through hole. The air pressure created in the chamber of the air accumulation may provide a greater expelling force, as compared to the air pressure provided by the (single) valve.

Using either the valve or the air accumulation module to expel the liquid, the through hole is free of, or at least substantially free of, the liquid, and access by the aforementioned components to the ambient environment outside of the electronic device is restored. By utilizing user interaction with the display assembly, the electronic device can rely upon customary usage of the electronic device to expel the liquid, rather than relying on other complex means that incorporate multiple mechanical and electrical components, as well as software upgrades. Other input mechanisms and devices can be used to drive or force air into the air accumulation module. For example, the electronic device may include a crown, or dial, that can be rotated by the user to drive air to the air accumulation module. The electronic device may also include a vibrational component, such as a haptic engine, that can oscillate and drive air to the air accumulation module.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with some described embodiments. As shown in FIG. 1, the electronic device 100 includes a wearable electronic device. For example, the electronic device 100 includes an enclosure 102, or housing, as well as a band 104a and a band 104b coupled to the enclosure 102. The band 104a may couple together with the band 104b to form a loop that secures around a user's appendage (such as a wrist) in order to secure the enclosure 102 (and more generally, the electronic device 100) to the user's appendage. The enclosure 102 may be formed from a material, such as steel (including stainless steel), ceramic, plastic, aluminum, or some combination thereof, as non-limiting examples. The enclosure 102 is designed to carry several components, such as a processor circuit, a memory circuit, a flexible circuit, a battery, a speaker module, and a microphone, as non-limiting examples.

The electronic device 100 may further include a transparent layer 106 coupled to the enclosure 102. The transparent layer 106 can provide a transparent protective cover for a display assembly 108 (shown as a dotted line). The display assembly 108 may include a display layer (not shown in FIG. 1) designed to present visual information in the form of motion images, still images, and/or textual information. The display layer may further present icons representing software application that can be executed and presented on the display layer. In order to interact with the display layer to change the visual information, the display assembly 108 may further include a touch input component (not shown in FIG. 1). Furthermore, the electronic device 100 may include an input mechanism 112 that represents a mechanical feature used to alter the visual information presented by the display layer of the display assembly 108. As shown in FIG. 1, the input mechanism 112 is a crown, or dial, designed to rotate about an axis of rotation to alter the visual information, and can also be depressed and actuated toward the enclosure 102 to alter the visual information. Although not shown, the electronic device 100 may further include additional input mechanisms in the form of button and switches, both of which are mechanical features with which a user can interact.

The electronic device 100 may further include through holes, or openings, formed in the enclosure 102. For example, the enclosure 102 includes a through hole 114 that allow air to enter and exit the enclosure 102. This allows a sensing component (not shown in FIG. 1), such a barometric pressure sensor, to determine ambient air pressure. Also, although not shown, the enclosure 102 may include additional through hole that are used to vent the electronic device 100.

Figure 2:
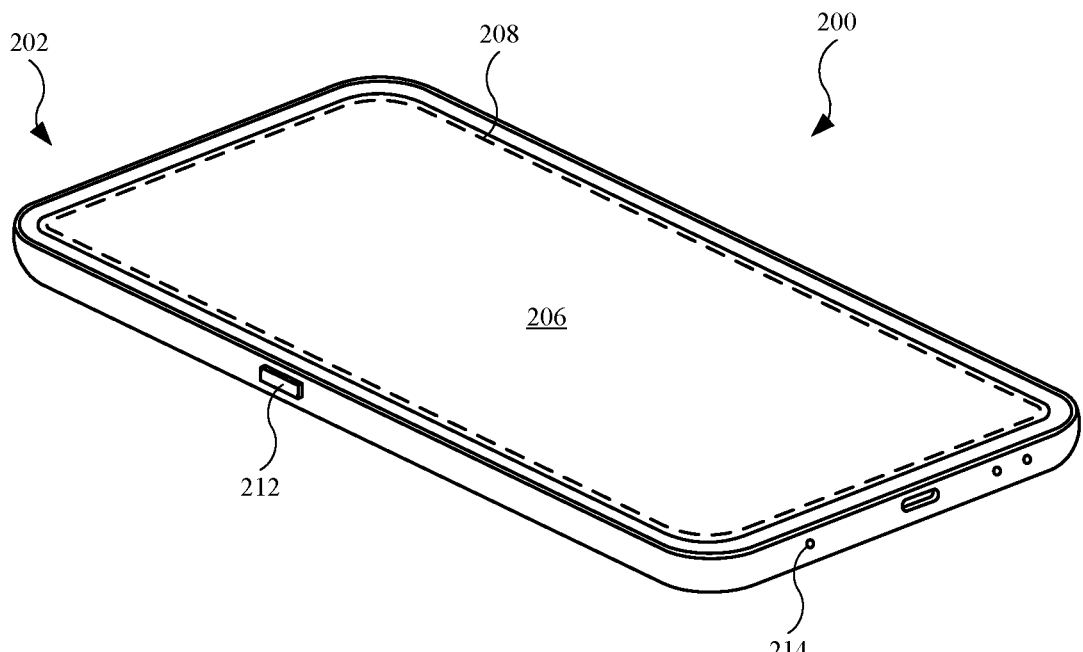
FIG. 2 illustrates an isometric view of an alternate embodiment of an electronic device, in accordance with some described embodiments.

FIG. 2 illustrates an isometric view of an alternative embodiment of an electronic device 200, in accordance with some described embodiments. As shown in FIG. 2, the electronic device 200 includes a mobile wireless communication device, such as a smartphone or a tablet computer. The electronic device 200 includes an enclosure 202, or housing. The enclosure 202 is designed to carry several components, such as a processor circuit, a memory circuit, a flexible circuit, a battery, a speaker module, and a microphone, as non-limiting examples. The electronic device 200 may further include a transparent layer 206 designed to provide a transparent protective cover. The electronic device 200 may further include a display assembly 208 (shown as a dotted line). The display assembly 208 may include a display layer (not shown in FIG. 2) that is designed to present visual information in the form of motion images, still images, and/or textual information. The display layer of the display assembly 208 may further present icons representing software application that can be executed and presented on the display assembly 208. In order to interact with the display assembly 208 to change the visual information, the display assembly 208 may further include a touch input component (not shown in FIG. 2) and a force detection unit (not shown in FIG. 2). Furthermore, the electronic device 200 may include an input mechanism 212 that represents a button that can be depressed to alter the visual information presented by the display layer of the display assembly 208. Although not shown, the electronic device 200 may further include additional input mechanisms in the form of button and switches, both of which are mechanical features with which a user can interact. The electronic device 200 may further include through holes, or openings, formed in the enclosure 202. For example, the electronic device 200 includes a through hole 214 that defines a void in the enclosure 202 that allow air to enter and exit the enclosure 202. This allows a sensing component (not shown in FIG. 2), such a barometric pressure sensor, to determine ambient air pressure.

Figure 3:
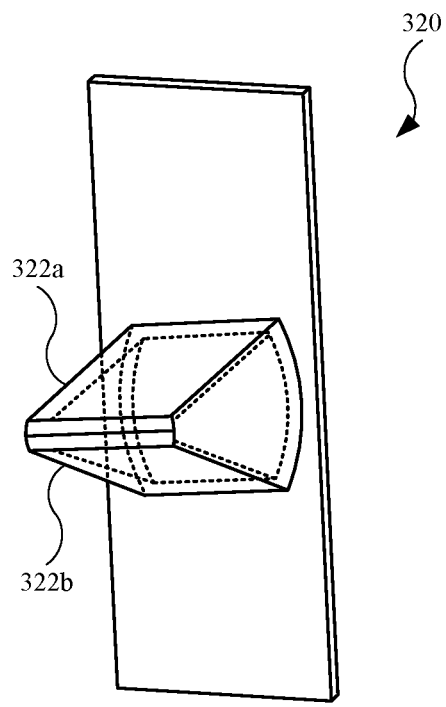
FIG. 3 illustrates an isometric view of an embodiment of a valve, in accordance with some described embodiments.

FIG. 3 illustrates an isometric view of an embodiment of a valve 320, in accordance with some described embodiments. When integrated into an electronic device (such as the electronic device 100 shown in FIG. 1 or the electronic device 200 shown in FIG. 2), the valve 320 can regulate air. The valve 320 includes a flap 322a and a flap 322b. These flaps can engage each other (as shown in FIG. 3) or separate.

Figure 4:
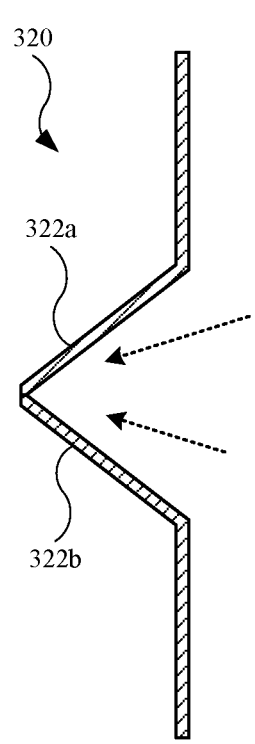
FIG. 4 illustrates a cross sectional view of the valve shown in FIG. 3, showing the valve in a closed position.

FIG. 4 illustrates a cross sectional view of the valve 320 shown in FIG. 3, showing the valve 320 in a closed position. The flap 322a is engaged with the flap 322b by a closing force. The closing force is a function of the selected material of the flaps (which can define a spring constant of the flaps) as well as the material thickness of the flaps. The valve 320 can remain closed when air (represented by dotted lines) is below a predetermined threshold air pressure.

Figure 5:
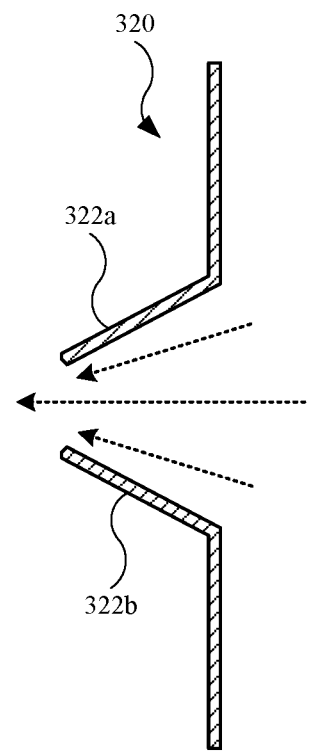
FIG. 5 illustrates a cross sectional view of the valve shown in FIG. 3, showing the valve in an open position.

FIG. 5 illustrates a cross sectional view of the valve 320 shown in FIG. 3, showing the valve 320 in an open position. As shown, the flap 322a is separated from the flap 322b. When the air (represented as dotted lines) reaches (or exceeds) the predetermined threshold air pressure, the air overcomes the closing force that maintains the flap 322a engaged with the flap 322b, causing the valve 320 to opening and allowing air to pass (through the valve 320). When the air pressure reduces below the predetermined threshold air pressure, the valve 320 returns to a closed position, as shown in FIG. 4. It should be noted that the valve 320 shown in FIGS. 3-5 may include features of a one-way valve by opening in response to airflow generally in one direction (denoted by the arrows of the dotted lines representing air), while remaining closed in response airflow in the opposite direction.

Figure 6:
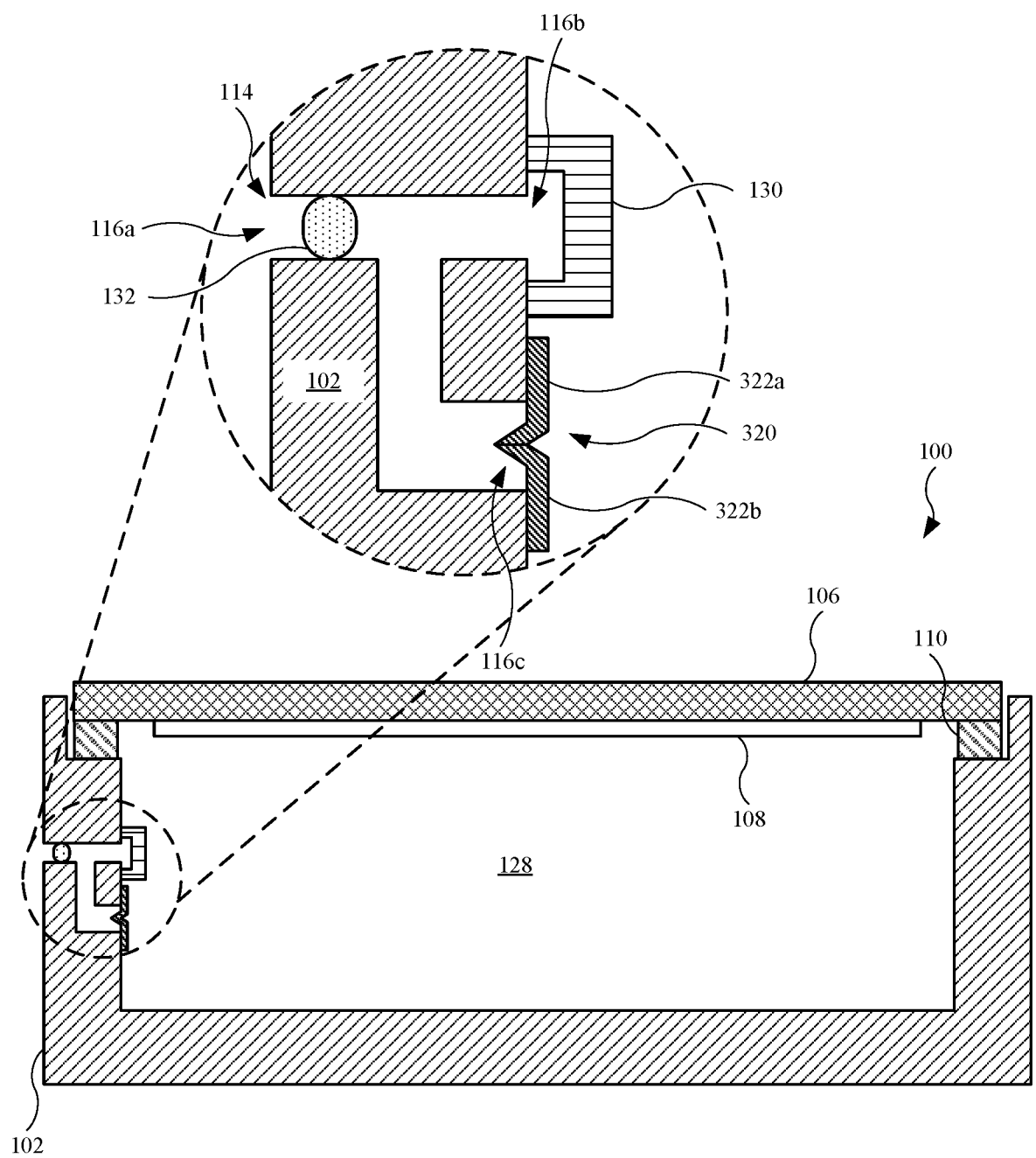
FIG. 6 illustrates a cross sectional view of the electronic device shown in FIG. 1, showing the valve covering an opening in the enclosure.

FIG. 6 illustrates a cross sectional view of the electronic device 100 shown in FIG. 1, showing the valve 320 covering an opening in the enclosure 102. As shown, the transparent layer 106 covers the display assembly 108. The transparent layer 106 can combine with the enclosure 102 to define an internal volume 128, with the valve 320 positioned in the internal volume 128. The electronic device 100 further includes a force detection unit 110 coupled with the transparent layer 106 and the enclosure 102. The force detection unit 110 is designed to determine an amount of force applied to the transparent layer 106 during a touch event from a user to the display assembly 108. The force detection unit 110 includes several capacitors (not shown in FIG. 6), with each capacitor having a pair of capacitor plates spaced apart from each other by a distance. In response to the applied force, the force detection unit 110 compresses, causing the distance of at least some the capacitor plates of the several capacitors to reduce. The reduction in the distance corresponds to the amount of force applied to the transparent layer 106.

As shown in the enlarged view, the through hole 114 may include an opening 116a formed on an exterior surface of the enclosure 102. The through hole 114 may further include an opening 116b and an opening 116c formed on an interior surface of the enclosure 102. Based on the aforementioned openings, the through hole 114 fully extends through the enclosure 102.

The electronic device 100 may further include a sensing component 130 designed to communicate with the ambient environment. In some embodiments, the sensing component 130 is a speaker. In other embodiments, the sensing component 130 is a microphone. In the embodiment shown in FIG. 6, the sensing component 130 is a pressure sensor (such as a barometric pressure sensor) designed to measure ambient air pressure. The electronic device 100 can use the ambient air pressure, as determined by the sensing component 130, to determine elevation changes (increases or decrease) of the electronic device 100 when, for example, the user of the electronic device 100 is climbing or descending. This information can be used to determine the user's fitness or activity levels.

In order to communicate with the environment and determine ambient air pressure, the sensing component 130 is aligned with the through hole 114 at the opening 116b. However, in some instances, a contaminant may become lodged in the through hole 114 and block (or at least partially block) the through hole 114, thereby preventing access by the sensing component 130 to the ambient air and subsequently reducing the performance of the sensing component 130. For example, as shown in FIG. 6, a liquid 132 is in the through hole 114. As a result, air may not enter or exit the enclosure 102.

Figure 7:
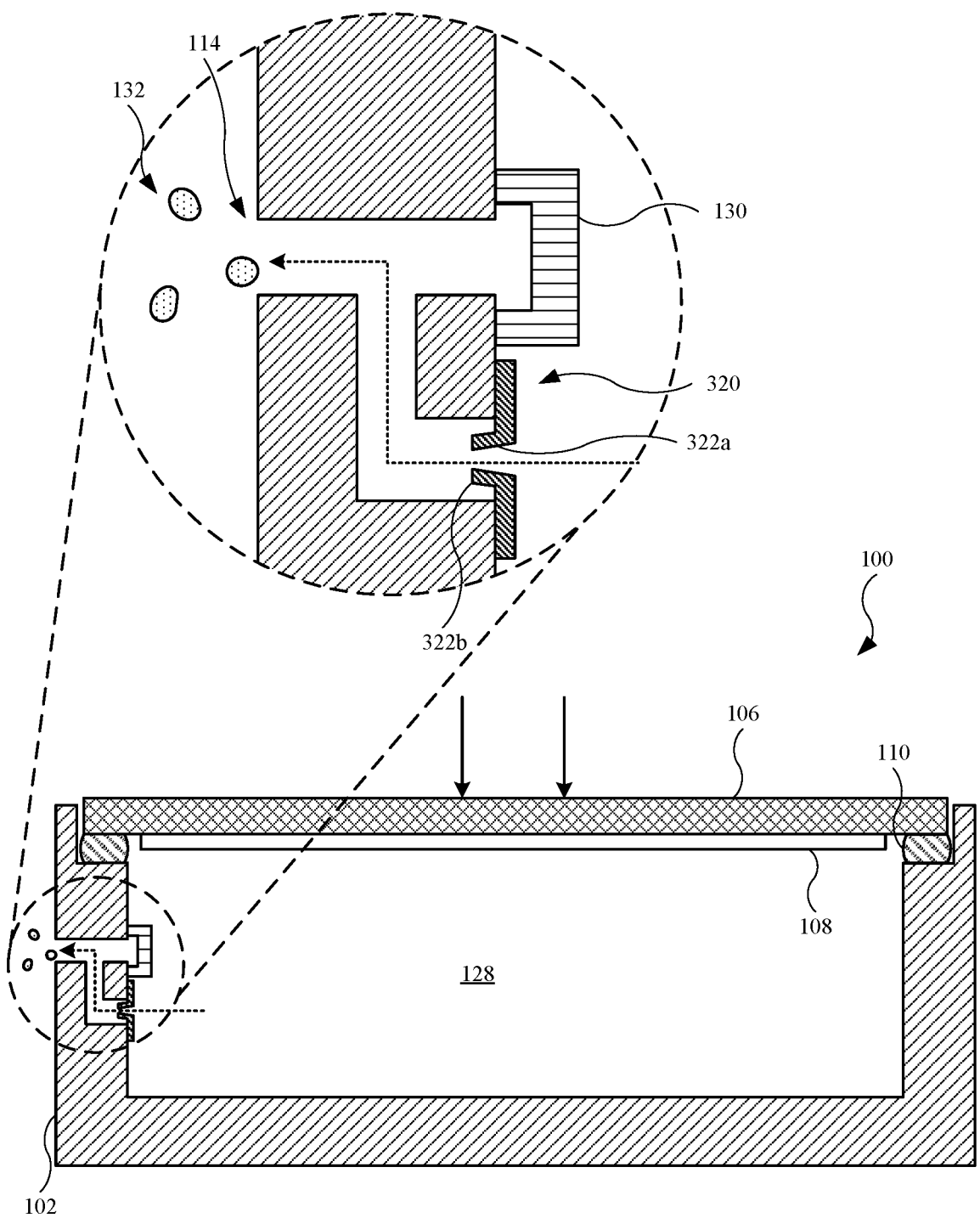
FIG. 7 illustrates a cross sectional view of the electronic device, showing the valve opening in response to a force applied to the transparent layer.

The electronic device 100 can use valve 320 and other features of the electronic device 100 to expel the liquid 132. For example, FIG. 7 illustrates a cross sectional view of the electronic device 100, showing the valve 320 opening in response to a force applied to the transparent layer 106. The force (represented by arrows) can be initiated by user interaction with the display assembly 108. The force causes the force detection unit 110 to compress, which causes the transparent layer 106 to move toward the enclosure 102. As a result, the internal volume 128 is reduced. Based upon this reduction, the volume of air in the internal volume 128 reduces, causing a corresponding increase in air pressure within the internal volume 128.

When the valve 320 is exposed to the increased air pressure, the flap 322a separates from the flap 322b and the valve 320 is open. The air (represented by the dotted lines) passes through the valve 320, and the force of the air (from the increased air pressure) expels the liquid 132 from the through hole 114. As a result, the sensing component 130 can again access the ambient environment. By using the valve 320, the air in the internal volume 128 cannot initially escape until a sufficient air pressure buildup occurs along the valve 320. This air pressure buildup provides a stronger expelling force used to expel the liquid 132, as opposed to allowing air to flow through the through hole 114 without using the valve 320 to create air pressure buildup. It should be noted that when the force is no longer applied to the transparent layer 106, the force detection unit 110 returns to its original uncompressed state, the internal volume 128 returns to its original (or initial) volume, the air pressure in the internal volume 128 returns to ambient pressure, and the valve 320 returns to the closed position (see FIG. 6, for example).

Figure 8:
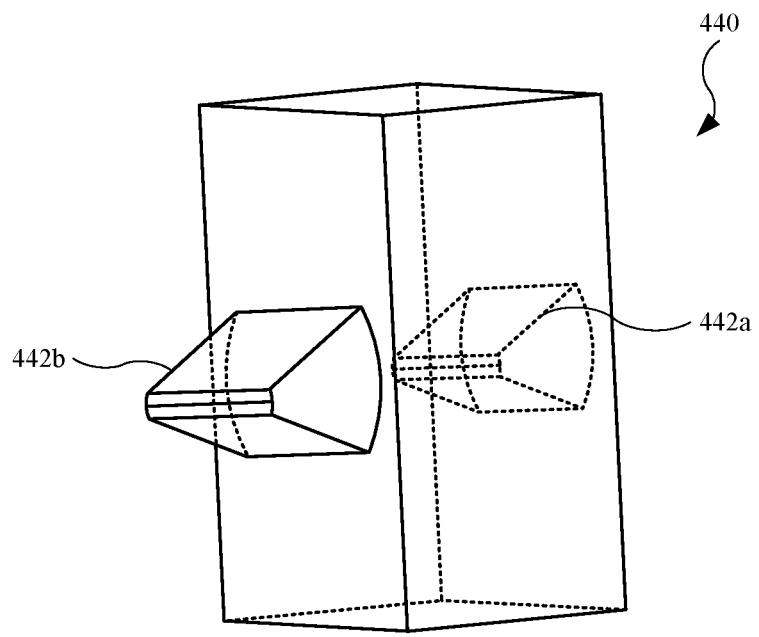
FIG. 8 illustrates an isometric view of an embodiment of an air accumulation module, in accordance with some described embodiments.

In some instances, a higher air pressure may be provided to force the liquid out of the enclosure. In this regard, the valve 320 can be replaced with an air accumulation module designed to provide increased air pressure. FIG. 8 illustrates an isometric view of an embodiment of an air accumulation module 440, in accordance with some described embodiments. The air accumulation module 440 is designed to receive air and store air such that internal air pressure (in the air accumulation module 440) increases and subsequently releases the air. In this regard, the air accumulation module 440 may include a valve 442a and a valve 442b. When integrated into an electronic device (not shown in FIG. 8), the valve 442a can be positioned to receive air, while the valve 442b can be positioned to expel air. This will be shown and described further below.

Figure 9:
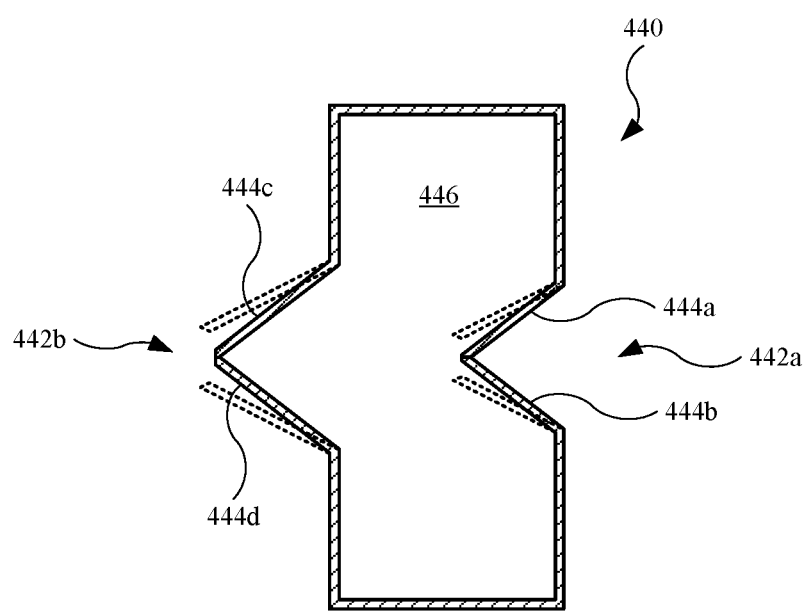
FIG. 9 illustrates a cross sectional view of the air accumulation module shown in FIG. 8.

FIG. 9 illustrates a cross sectional view of the air accumulation module 440 shown in FIG. 8. The valve 442a may include a flap 444a and a flap 444b, while the valve 442b may include a flap 444c and a flap 444d. The air accumulation module 440 may further include a chamber 446 designed to receive air and store air, causing internal air pressure in the chamber 446 to increase. As shown, the valve 442a and the valve 442b are both in the closed position, as their respective flaps are engaged with each other. However, as denoted by dotted lines, the valve 442a and the valve 442b may transition to an open position. The valve 442a and the valve 442b may transition from the closed position to the open position when sufficient air pressure cause the valve 442a and the valve 442b. Moreover, different air pressured may be required to open the valves. For example, the valve 442b may require a higher air pressure as compared to the air pressure required to open the valve 442a. As a result, prior to the valve 442b opening, the valve 442a may open and allow air into the chamber 446, and a subsequent air pressure buildup ensues in the chamber 446 so long as the valve 442b remains closed. When integrated into an electronic device (not shown in FIG. 9), multiple user interactions with the electronic device cause multiple instances of air to enter the chamber 446 through the valve 442a. However, as air continues to enter the chamber 446, the air pressure in the chamber 446 reaches (or exceeds) an air pressure required to open the valve 442b. This causes the valve 442b opens and the air inside the chamber 446 exits through the valve 442b. When the air pressure decreases below the air pressure required to open the valve 442b, the valve 442b closes. Also, when the air pressure decreases below the air pressure required to open the valve 442a, the valve 442a closes.

Figure 10:
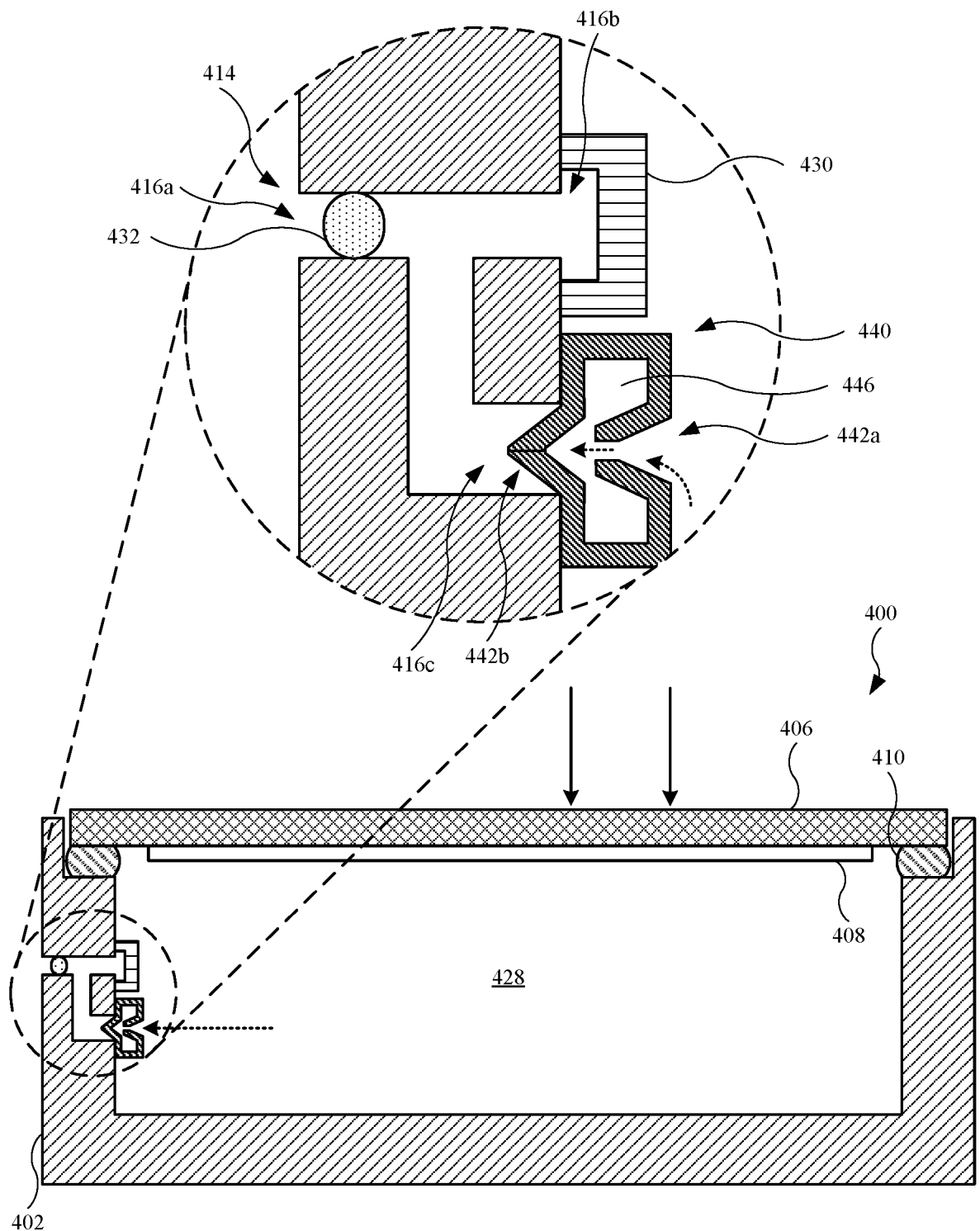
FIG. 10 illustrates a cross sectional view of an embodiment of an electronic device, showing the air accumulation module integrated with the electronic device, in accordance with some described embodiments.
Figure 11:
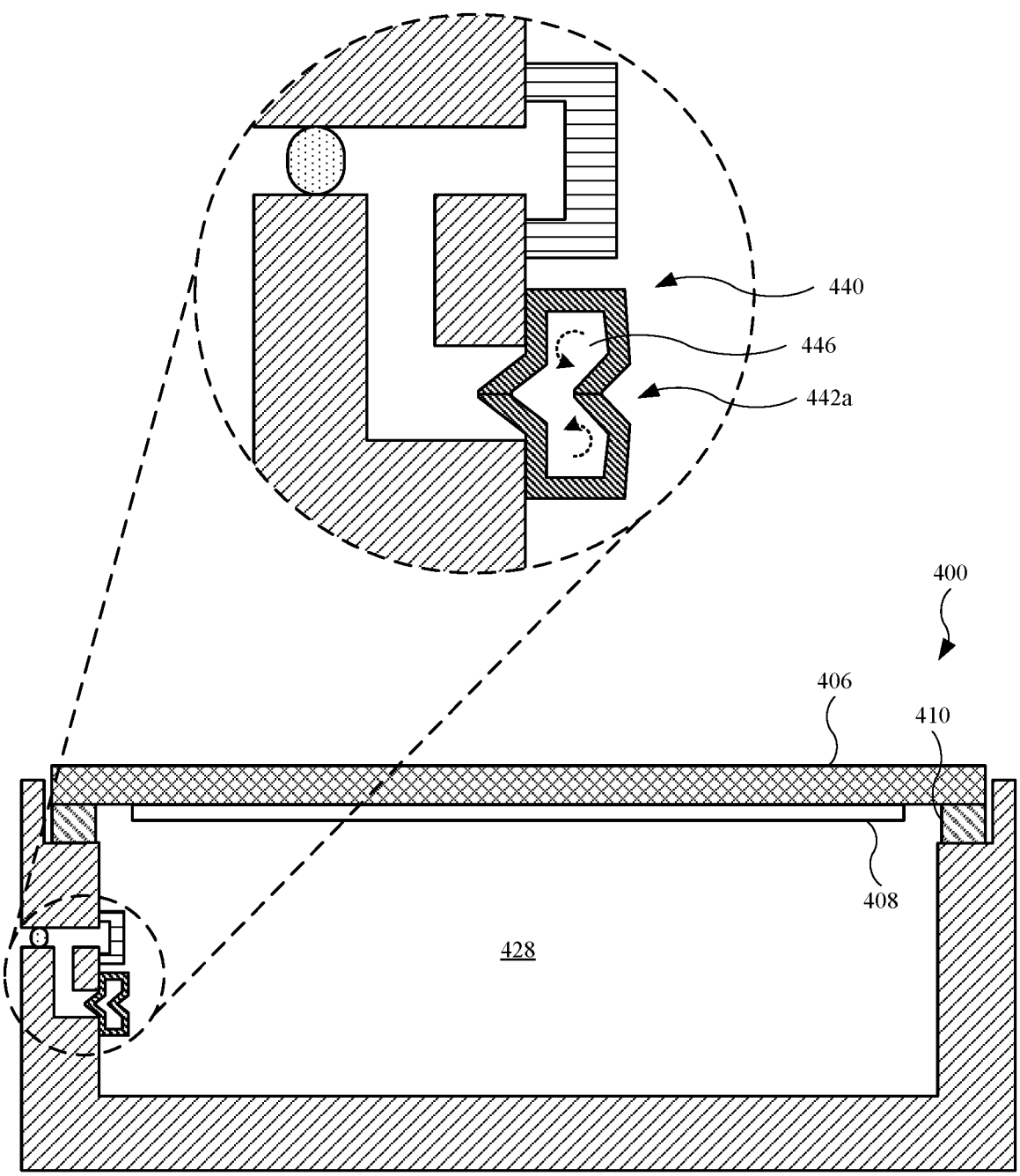
FIG. 11 illustrates a cross sectional view of the electronic device shown in FIG. 10, showing the air accumulation module filled with air.
Figure 12:
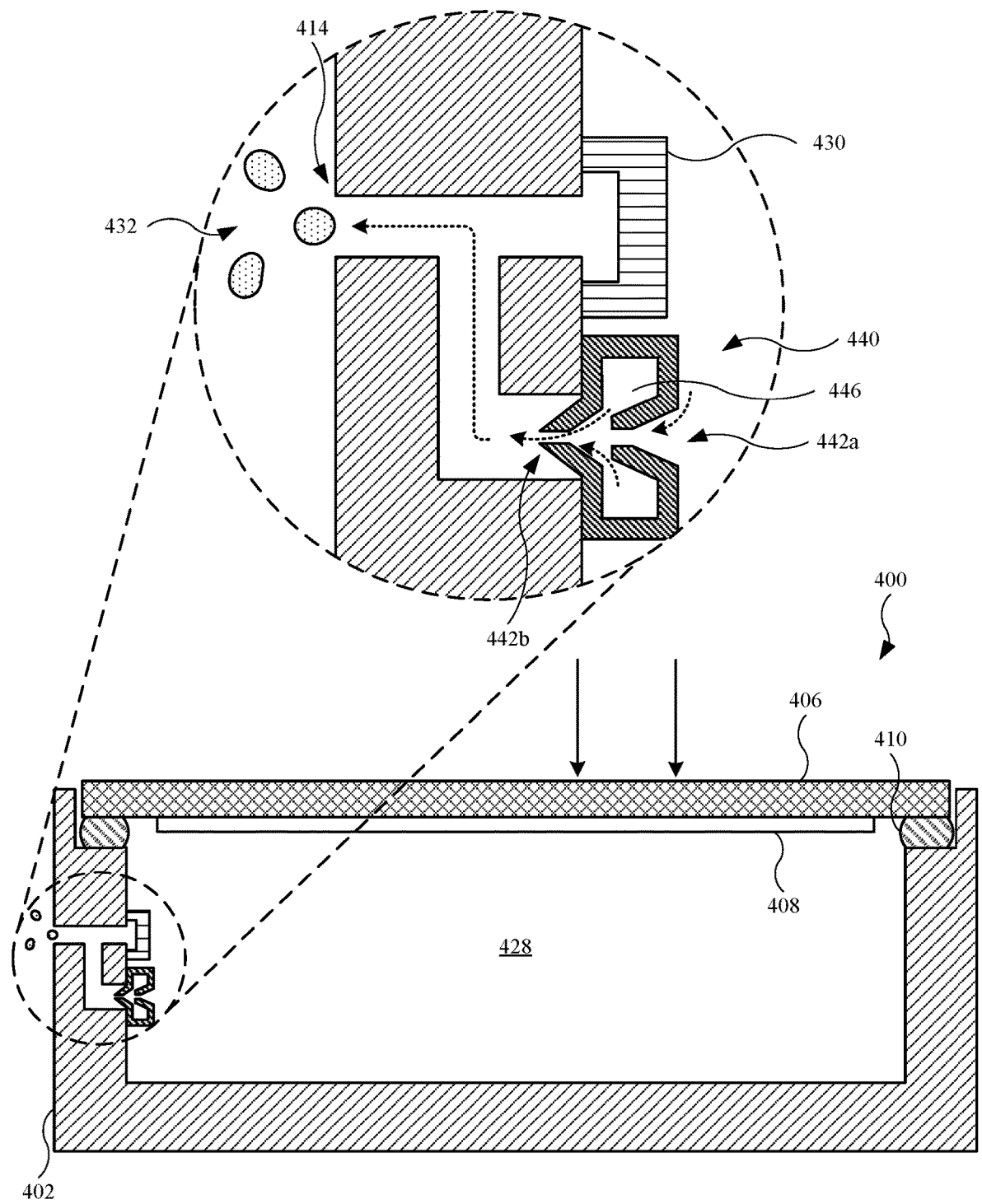
FIG. 12 illustrates a cross sectional view of the electronic device shown in FIG. 11, showing a force applied to the transparent layer.

FIGS. 10-12 show the air accumulation module 440 integrated with an electronic device. FIG. 10 illustrates a cross sectional view of an embodiment of an electronic device 400, showing the air accumulation module 440 integrated with the electronic device 400, in accordance with some described embodiments. The electronic device 400 may include any components and associated features described herein for an electronic device. For example, the electronic device 400 may include an enclosure 402 and a transparent layer 406 coupled with the enclosure 402 by a force detection unit 410. The electronic device 400 may further include a display assembly 408 coupled to the transparent layer 406. The enclosure 402 may include a through hole 414 with several openings.

As shown in the enlarged view, the through hole 414 may include an opening 416a, an opening 416b, and an opening 416c. The opening 416a is formed on an exterior surface of the enclosure 402, while the opening 116b and the opening 116c are formed on an interior surface of the enclosure 402. Based on the aforementioned openings, the through hole 114 fully extends through the enclosure 402. The air accumulation module 440 is aligned with the opening 416c. Also, electronic device 400 may include a sensing component 430 aligned with the opening 416b. The sensing component 430 is designed to communicate with the ambient environment. However, a liquid 432 is positioned in the through hole 414.

When a force (represented by arrows) is applied by, for example, user interaction with the display assembly 408, the force detection unit 410 compresses and the transparent layer 406 moves toward the enclosure 402. As a result, an internal volume 428 (defined by the enclosure 402 and the transparent layer 406) is reduced. Based upon this reduction, the volume of air in the internal volume 428 reduces, causing a corresponding increase in air pressure within the internal volume 428. As a result of the increased air pressure from the internal volume 428 decreasing, the valve 442a opens and air (represented by dotted lines) begins to enter the chamber 446 of the air accumulation module 440, causing the internal air pressure within the chamber to increase. However, the valve 442b remains closed.

FIG. 11 illustrates a cross sectional view of the electronic device 400 shown in FIG. 10, showing the air accumulation module 440 filled with air. Subsequent to the user interaction with the display assembly 408, the force is no longer applied to the transparent layer 406, and the force detection unit 410 returns to an uncompressed state. As a result, the internal volume 428 increases (to its original state) and the air pressure in the internal volume 428 decreases. As shown in the enlarged view, the valve 442a is closed and air is trapped in the chamber 446. The internal air pressure in the chamber 446 is elevated as a result of the air entering the valve 442a.

FIG. 12 illustrates a cross sectional view of the electronic device shown in FIG. 11, showing a force applied to the transparent layer 406. The force (represented by arrows) may result from a subsequent user interaction (or subsequent user interactions) to the display assembly 408. In other words, the user interact in FIG. 12 may be subsequent to the user interaction described in FIG. 10. The subsequent user interaction(s) with the display assembly 408 causes the force detection unit 410 to compress and the transparent layer 406 moves toward the enclosure 402. As a result, the internal volume 428 is again reduced, causing a corresponding increase in air pressure within the internal volume 428.

As shown in the enlarged view, the increased air pressure causes the valve 442a to open and air (represented by dotted lines) again enters the chamber 446, causing the internal air pressure within the chamber 446 to further increase. While a prior internal pressure increase in the chamber 446 did not open the valve 442b, the internal pressure increase in the chamber 446 resulting from the force to the transparent layer 406 (shown in FIG. 12) that increases air pressure in the internal volume 428 causes the valve 442b to open. As a result, the air is released from the air accumulation module 440 through the valve 442b, and the force from the released air expels the liquid 432 from the through hole 414. The sensing component 430 may again communicate with the ambient environment via the through hole 414.

FIG. 10-12 show that each user interaction with the display assembly 108 can result in air being pumped into the air accumulation module 440. The internal air pressure in the air accumulation module 440 (in particular, in the chamber 446) is allowed to increase for one or more user interactions until the internal air pressure in the air accumulation module 440 forces the valve 442b open. This may result in an increased force from the air when the air is released from the air accumulation module 440, as compared to the force from the air pressure that opens the valve 320 (shown in FIGS. 6 and 7). Accordingly, the air accumulation module 440 may provide a greater expelling force to remove liquids or contaminants that are lodged or otherwise positioned in a through hole of an enclosure of an electronic device.

FIGS. 13-16 illustrate different features in an electronic device that can be used to drive air to an air accumulation module, which can then expel a liquid or other contaminant. Similar to the user interaction with a display assembly, the features shown in FIGS. 13-16 can also drive air through user interaction. The air accumulation modules shown in FIGS. 14 and 16 may function in a manner previously describe for an air accumulation module. Also, while an air accumulation module is shown and described in FIGS. 13-16, a valve, such as the valve 320 (shown in FIGS. 3-7), can replace the air accumulation module.

Figure 13:
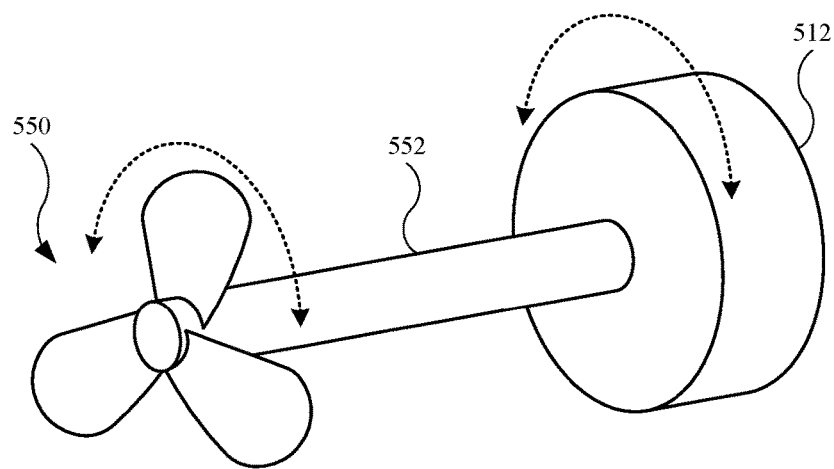
FIG. 13 illustrates an isometric view of an embodiment of an input mechanism and an air driving mechanism attached to the input mechanism, in accordance with some described embodiments.

FIG. 13 illustrates an isometric view of an embodiment of an input mechanism 512 and an air driving mechanism 550 attached to the input mechanism 512, in accordance with some described embodiments. When integrated into an electronic device (not shown in FIG. 13), the input mechanism 512 may include a user interaction device, similar to the input mechanism 112 (shown in FIG. 1). In this regard, the input mechanism 512 may include a crown that is rotated by a user, with the rotation causing an adjustment to visual information presented on a display assembly of an electronic device.

As shown, the input mechanism 512 is coupled to the air driving mechanism 550 by a shaft 552. The air driving mechanism 550 may include several blades, resembling blades of a fan. In this manner, rotation of the input mechanism 512 causes rotation of the air driving mechanism 550, as well as the shaft 552, with the rotation of the air driving mechanism 550 driving air.

Figure 14:
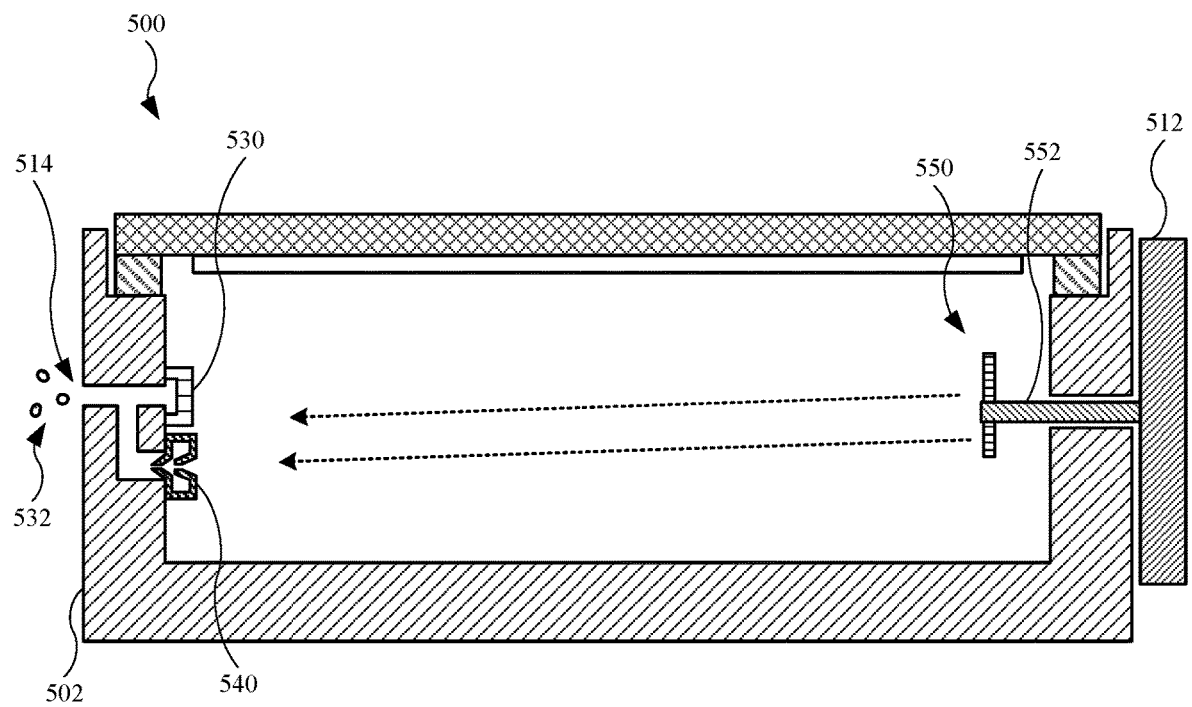
FIG. 14 illustrates a cross sectional view of an embodiment of an electronic device, showing the air driving mechanism moving air toward an air accumulation module, in accordance with some described embodiments.

FIG. 14 illustrates a cross sectional view of an embodiment of an electronic device 500, showing the air driving mechanism 550 moving air toward an air accumulation module 540, in accordance with some described embodiments. The electronic device 500 may include any components and associated features described herein for an electronic device. The input mechanism 512, the air driving mechanism 550, and the shaft 552 are integrated into the electronic device 500. When the input mechanism 512 is rotated, the rotation is translated to the air driving mechanism 550 via the shaft 552, and the air driving mechanism 550 drives air (shown as dotted lines) toward into an air accumulation module 540 via a valve (not labeled) of the air accumulation module 540. The air accumulation module 540 may include any features described herein for an air accumulation module, such as multiple valves and a chamber. Driving air into air accumulation module 540 by rotating the input mechanism 512 can increase internal air pressure in the air accumulation module 540 until an additional valve of the air accumulation module 540 opens, releasing the air through a through hole 514 formed in an enclosure 502 of the electronic device 500. The force from the released air from the air accumulation module 540 may expel a liquid 532 from the through hole 514, and a sensing component 530 of the electronic device 500 may be in communication with the ambient environment.

Figure 15:
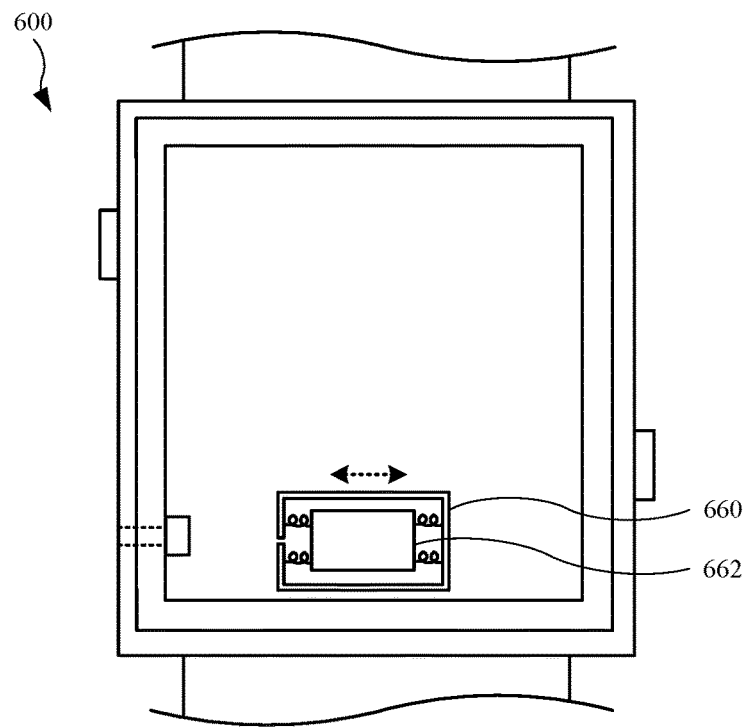
FIG. 15 illustrates a plan view of an embodiment of an electronic device, showing a vibrational component, in accordance with some described embodiments.

FIG. 15 illustrates a plan view of an embodiment of an electronic device 600, showing a vibrational component 660, in accordance with some described embodiments. The electronic device 600 may include any components and associated features described herein for an electronic device. For purposes of simplicity and illustration, the transparent layer, the display assembly, and the force detection unit are removed. The vibrational component 660 may include a haptic engine. In this regard, the vibrational component 660 may include a mass 662 carried by several springs (not labeled). The mass 662 is designed to oscillate at a predetermined frequency. The oscillation of the mass 662 may create a feedback, such as a haptic feedback, that is felt or otherwise recognized by a user of the electronic device 600. Also, the oscillation of the mass 662 can drive air within the electronic device 600.

Figure 16:
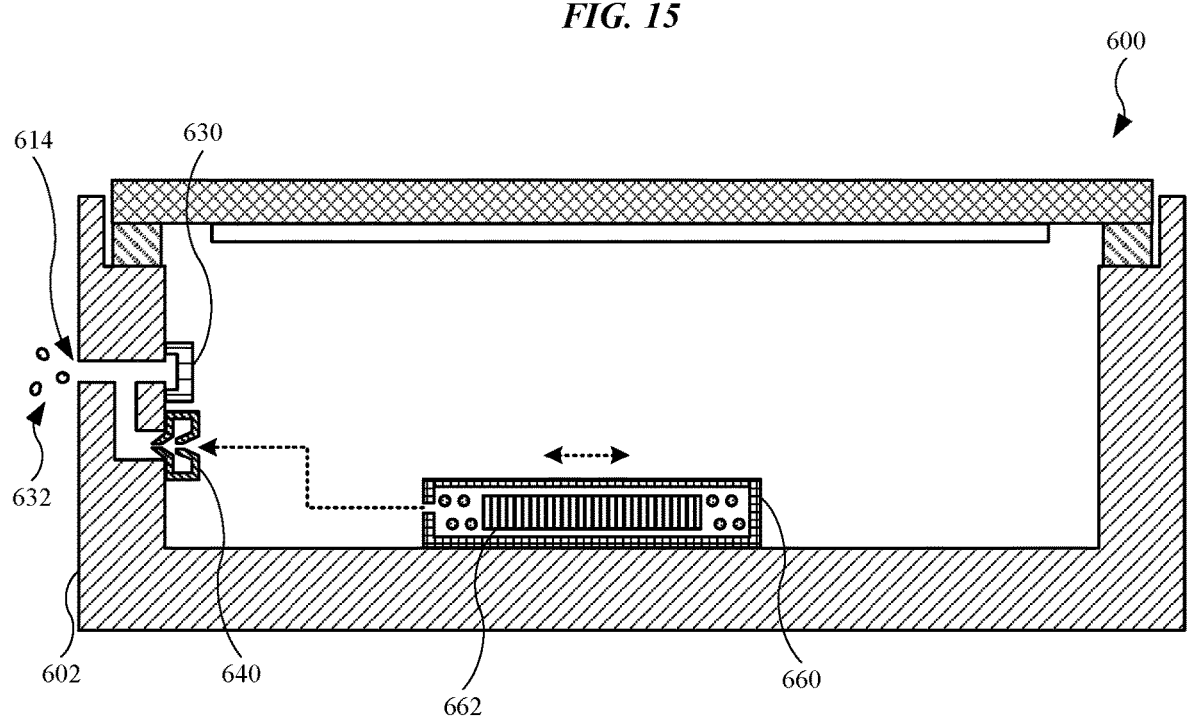
FIG. 16 illustrates a cross sectional view of the electronic device shown in FIG. 15, showing the vibrational component moving air toward an air accumulation module, in accordance with some described embodiments.

FIG. 16 illustrates a cross sectional view of the electronic device 600 shown in FIG. 15, showing the vibrational component 660 moving air toward an air accumulation module 640, in accordance with some described embodiments. When the mass 662 oscillates, the oscillation causes air to leave vibrational component 660. The air (shown as dotted lines) can be driven toward into an air accumulation module 640 via a valve (not labeled) of the air accumulation module 640. The air accumulation module 640 may include any features described herein for an air accumulation module. Driving air into air accumulation module 640 through oscillation can increase internal air pressure in the air accumulation module 640 until an additional valve of the air accumulation module 640 opens, releasing the air through a through hole 614 formed in an enclosure 602 of the electronic device 600. The force from the released from the air accumulation module 640 may expel a liquid 632 from the through hole 614, and a sensing component 630 of the electronic device 600 may be in communication with the ambient environment.

Figure 17:
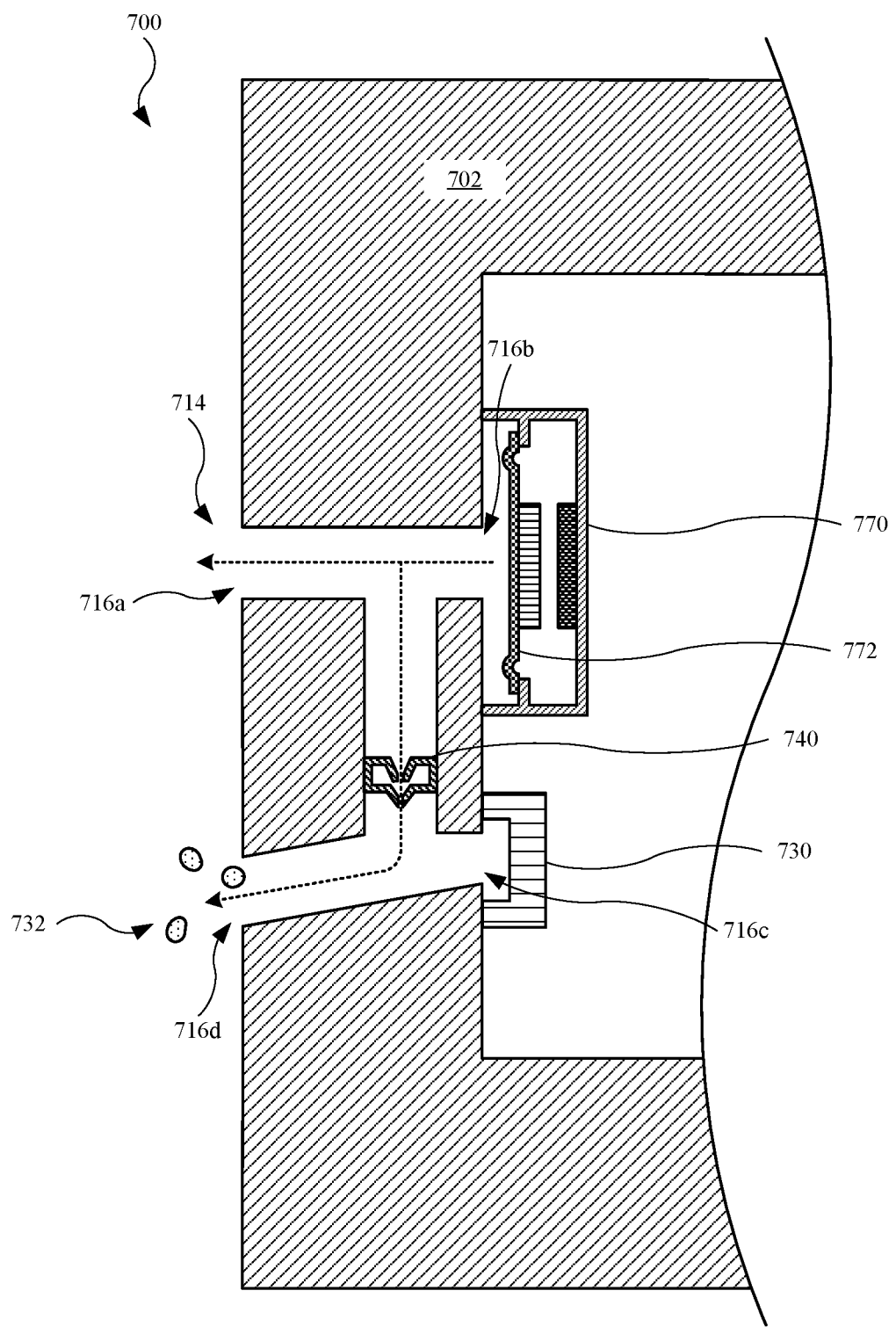
FIG. 17 illustrates a cross sectional view of an embodiment of an electronic device, showing a speaker module, in accordance with some described embodiments.

FIG. 17 illustrates a cross sectional view of an embodiment of an electronic device 700, showing a speaker module 770, in accordance with some described embodiments. The electronic device 700 may include any components and associated features described herein for an electronic device. As shown, the electronic device 700 may include an enclosure 702 having a through hole 714 that passes through the enclosure 702. The through hole 714 may include an opening 716a and an opening 716d formed on an exterior surface of the enclosure 702, as well as an opening 716b and an opening 716c formed on an interior surface of the enclosure 702. Based on the aforementioned openings, the through hole 714 fully extends through the enclosure 702. The electronic device 700 may further include an air accumulation module 740 positioned in the through hole 714. Also, the electronic device 700 may further include a sensing component 730. The sensing component 730 and the air accumulation module 740 may include any features described herein for a sensing component and an air accumulation module, respectively.

The speaker module 770, aligned with the opening 716b, is designed to generate acoustical energy in the form of audible sound. The speaker module 770 may include a diaphragm 772 that is driven to generate the acoustical energy. While being driven, the diaphragm 772 pushes air and creates sounds waves. The air accumulation module 740 may be positioned in a manner such that air (shown as dotted lines) driven by the speaker module 770 causes a valve (not labeled) of the air accumulation module 740 to open. Driving air into air accumulation module 740 through use of the speaker module 770 can increase internal air pressure in the air accumulation module 740 until an additional valve of the air accumulation module 740 opens, releasing the air through the through hole 714, and in particular through the opening 716d. The force from the released air may expel a liquid 732 from the through hole 714, and the sensing component 730 may be in communication with the ambient environment.

The foregoing embodiments provide passive means for expelling a liquid. For instance, regular user interaction with a display assembly or an input mechanism of an electronic device can initiate air movement in the electronic device to open a valve (or valves) and ultimately drive out air using an elevated air pressure. However, the electronic device may include some modifications that provide a more active means for expelling air.

Figure 18:
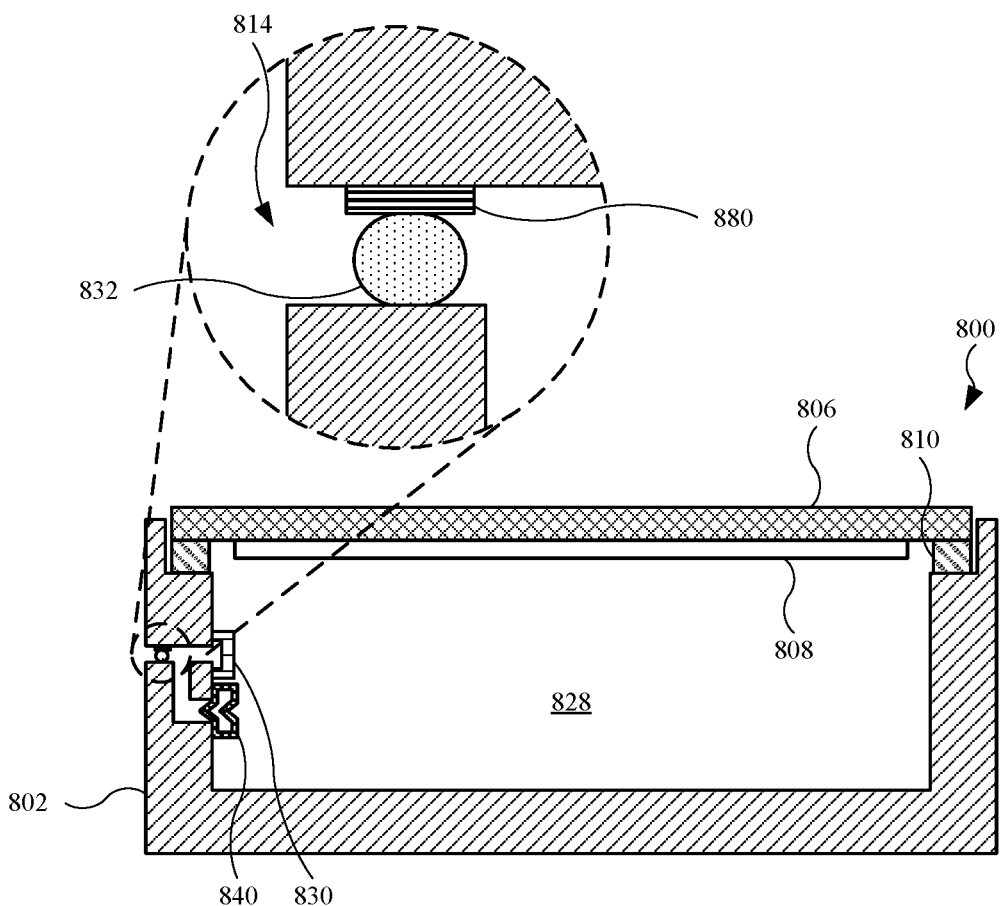
FIG. 18 illustrates a cross sectional view of an embodiment of an electronic device, showing a liquid sensor, in accordance with some described embodiments.

FIG. 18 illustrates a cross sectional view of an embodiment of an electronic device 800, showing a liquid sensor 880, in accordance with some described embodiments. The electronic device 800 may include any components and associated features described herein for an electronic device. As shown, the electronic device 800 includes an enclosure 802 a having a through hole 814. The electronic device 800 may further a transparent layer 806 coupled with the enclosure 802 by a force detection unit 810, and a display assembly 808 coupled with the transparent layer 806. The enclosure 802 and the transparent layer 806 may define an internal volume 828 that holds several operational components (not shown in FIG. 18) as well air. The electronic device 800 may further include a sensing component 830 and an air accumulation module 840. The sensing component 830 and the air accumulation module 840 may include any features described herein for a sensing component and an air accumulation module, respectively.

Figure 19:
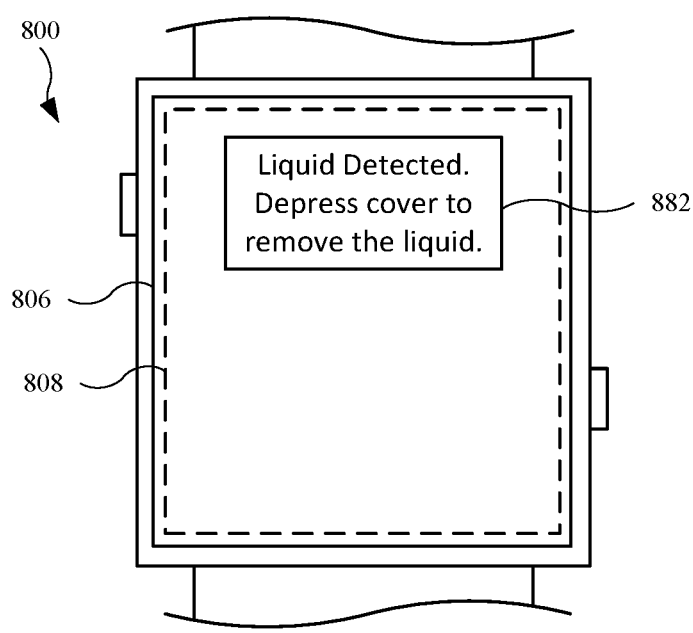
FIG. 19 illustrates a plan view of the electronic device shown in FIG. 18, showing a display assembly presenting a notification, in accordance with some described embodiments.

As shown in the enlarged view, a liquid 832 is positioned in the through hole 814, and in proximity to the liquid sensor 880 such that the liquid sensor 880 can detect the liquid 832. The liquid sensor 880 may provide an input to a processor (not shown in FIG. 18) of the electronic device 800, and the processor can instruct the display assembly 808 to provide a notification on a display layer (not shown) of the display assembly 808 that the liquid 832 is detected. For example, FIG. 19 illustrates a plan view of the electronic device 800 shown in FIG. 18, showing a display assembly 808 presenting a notification 882, in accordance with some described embodiments. In particular, a display layer of the display assembly 808 can present the notification 882. The notification 882 can be generated based on detection of the liquid 832 by the liquid sensor 880 (shown in FIG. 18). By providing the notification 882 on the display assembly 808, the user can actively take action to expel the liquid 832. This may be advantageous in situations in which the user frequently subjects the electronic device 800 to a liquid. Referring again to FIG. 18, the user can provide a touch input to the display assembly 808 by depressing the transparent layer 806, thereby causing the force detection unit 810 to compress and the internal volume 828 to reduce (similar to a manner previously described). The reduction in the internal volume 828 may cause air pressure of air in the internal volume to increase, and the air may be forced into the air accumulation module 840 (similar to a manner previously described). Further, after multiple user interactions with the display assembly 808 that increases the air pressure in the internal volume 828, the internal air pressure in the air accumulation module 840 increases, and a valve (not labeled) opens and the air passes through the through hole 814. The air pressure from the air may expel the liquid 832. When the liquid sensor 880 no longer detects the liquid 832, the liquid sensor 880 may provide an input to the processor, and the processor can command the display assembly 808 to remove the notification 882.

Figure 20:
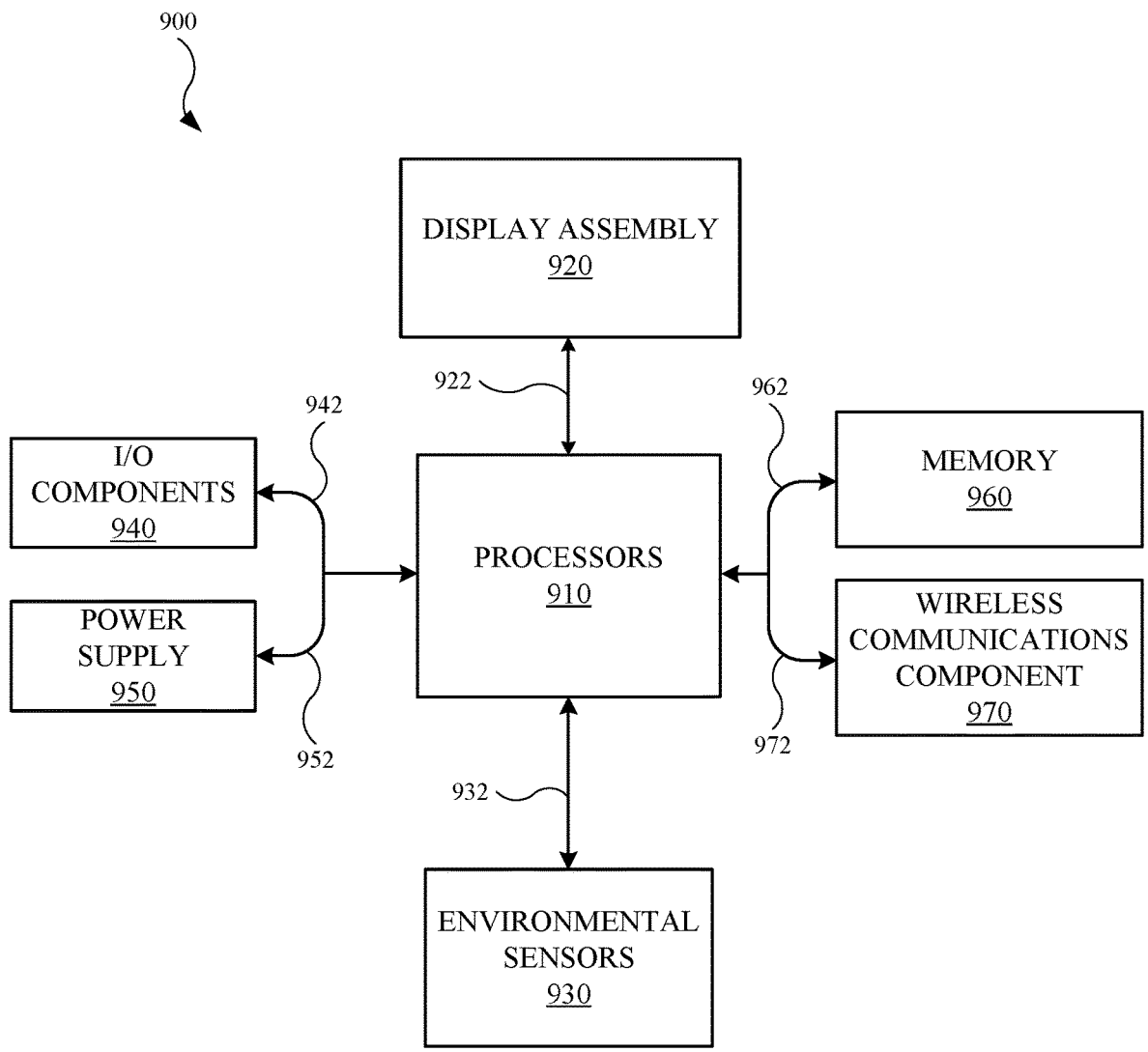
FIG. 20 illustrates a block diagram of a portable electronic device, in accordance with some embodiment.

FIG. 20 illustrates a block diagram of a portable electronic device 900, in accordance with some embodiment. The portable electronic device 900 is capable of implementing the various techniques described herein. The portable electronic device 900 may include any features described herein for an electronic device. Also, electronic devices described herein may include any feature or features described for the portable electronic device 900. In some embodiments, the portable electronic device 900 takes the form of the electronic device 100 (shown in FIG. 1). The portable electronic device 900 can include one or more processors 910 for executing functions of the portable electronic device 900. The one or more processors 910 can refer to at least one of a central processing unit (CPU) and at least one microcontroller for performing dedicated functions.

According to some embodiments, the portable electronic device 900 can include a display assembly 920. The display assembly 920 is capable of presenting a user interface that includes icons (representing software applications), textual images, and/or motion images. In some examples, each icon can be associated with a respective function (such as a software application) that can be executed by the one or more processors 910. In some cases, the display assembly 920 includes a display layer (not illustrated), which can include a liquid-crystal display (LCD), light-emitting diode display (LED), organic light-emitting diode display (OLED), or the like. According to some embodiments, the display assembly 920 includes a touch input detection component that can be configured to detect changes in an electrical parameter (e.g., electrical capacitance value) when the user's appendage (acting as a capacitor) comes into proximity with the display assembly 920 (or in contact with a transparent layer that covers the display assembly 920). The display assembly 920 is connected to the one or more processors 910 via one or more connection cables 922.

According to some embodiments, the portable electronic device 900 can include one or more environmental sensors 930 capable of detecting environmental conditions that are present within, or general proximate to, the portable electronic device 900. In some examples, the one or more environmental sensors 930 may include a humidity sensor, a temperature sensor, a liquid sensor, an ambient pressure sensor, underwater depth sensor, a magnetic field sensor, a strain gage, a capacitive sensor, a barometric pressure sensor, a microphone, and/or a thermometer. In some embodiments, the one or more environmental sensors 930 can determine whether the portable electronic device 900 is exposed to a specific environmental stimulus (e.g., moisture). In response, the one or more processors 910 can modify a notification that is presented by the display assembly 920 that corresponds to the specific environmental stimulus. The one or more environmental sensors 930 is/are connected to the one or more processors 910 via one or more connection cables 932.

According to some embodiments, the portable electronic device 900 can include one or more input/output components 940 (also referred to as "I/O components") that enable communication between a user and the portable electronic device 900. In some cases, the one or more input/output components 940 can refer to a button or a switch that is capable of actuation by the user. In some cases, the one or more input/output components 940 can refer to a soft key that is flexibly programmable to invoke any number of functions. In some examples, the one or more input/output components 940 can refer to a switch having a mechanical actuator (e.g., spring-based switch, slide-switch, rocker switch, rotating dial, etc.) or other moving parts that enable the switch to be actuated by the user. In some examples, the one or more input/output components 940 can include a capacitive switch that is integrated with the display assembly 920. Also, the one or more input/output components 940 can include a force detect unit that includes several force detection units, each of which is designed to detection an amount of applied force (by, for example, a touch input) to the display assembly 920. When the one or more input/output components 940 are used, the input/output components 940 can generate an electrical signal that is provided to the one or more processors 910 via one or more connection cables 942.

According to some embodiments, the portable electronic device 900 can include a power supply 950 that is capable of providing energy to the operational components of the portable electronic device 900. In some examples, the power supply 950 can refer to a rechargeable battery. The power supply 950 can be connected to the one or more processors 910 via one or more connection cables 952. The power supply 950 can be directly connected to other devices of the portable electronic device 900, such as the one or more input/output components 940. In some examples, the portable electronic device 900 can receive power from another power sources (e.g., an external charging device) not shown in FIG. 20.

According to some embodiments, the portable electronic device 900 can include memory 960, which can include a single disk or multiple disks (e.g., hard drives), and includes a storage management module that manages one or more partitions within the memory 960. In some cases, the memory 960 can include flash memory, semiconductor (solid state) memory or the like. The memory 960 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 900. In some embodiments, the memory 960 refers to a non-transitory computer readable medium, where an operating system (OS) is established at the memory 960 that can be configured to execute software applications, confidence interval algorithms, and/or machine learning algorithms that are stored at the memory 960. The one or more processors 910 can also be used to execute software applications, confidence interval algorithms, and/or machine learning algorithms that are stored at the memory 960. In some embodiments, a data bus 962 can facilitate data transfer between the memory 960 and the one or more processors 910.

According to some embodiments, the portable electronic device 900 can include a wireless communications component 970. A network/bus interface 972 can couple the wireless communications component 970 to the one or more processors 910. The wireless communications component 970 can communicate with other electronic devices via any number of wireless communication protocols, including at least one of a global network (e.g., the Internet), a wide area network, a local area network, a wireless personal area network (WPAN), or the like. In some examples, the wireless communications component 970 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), or the like.

Figure 21:
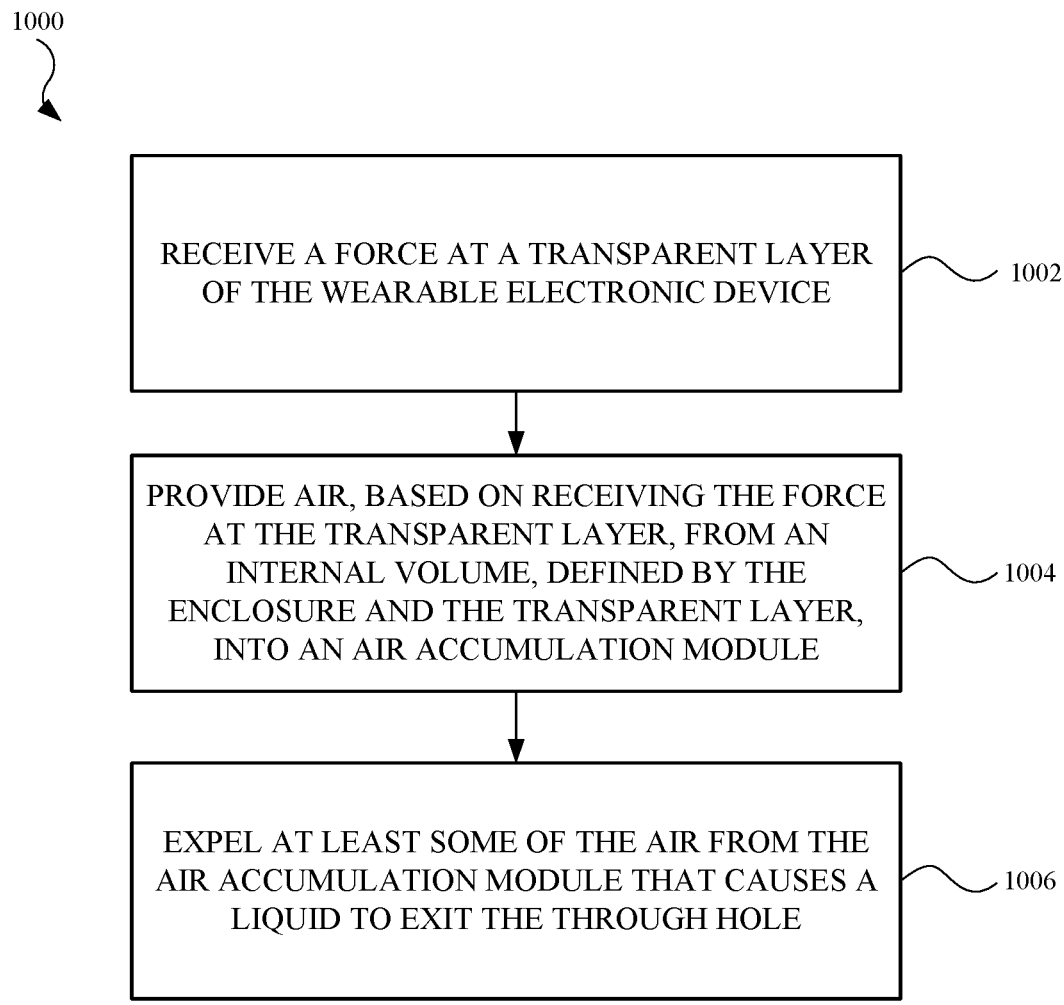
FIG. 21 illustrates a flowchart showing a method for expelling a liquid from a wearable electronic device, in accordance with some described embodiments.

FIG. 21 illustrates a flowchart 1000 showing a method for expelling a liquid from a wearable electronic device, in accordance with some described embodiments. The wearable electronic device may include an enclosure having a through hole. Also, the wearable electronic device may include one or more bands designed to secure the wearable electronic device to a user.

In step 1002, a force is received at a transparent layer of the wearable electronic device. The force may result from user interaction with the wearable electronic device. For instance, the wearable electronic device may include a display assembly capable of receiving a touch input. The transparent layer may be coupled to the enclosure by a force detection unit design to determine an amount of force applied to the transparent layer during user interaction with the display assembly. Also, the force may compress the force detection unit, and the transparent layer moves toward the enclosure.

In step 1004, air is provided, based on receiving the force at the transparent layer, from an internal volume, defined by the enclosure and the transparent layer, into an air accumulation module of the wearable electronic device. When the transparent layer moves toward the enclosure, the internal volume decreases, which causes the air volume in the internal volume to decrease. The decreased air volume results in a corresponding increased air pressure of the air. The increased air pressure may open a valve of the air accumulation module, causing air to enter a chamber of the air accumulation module.

In step 1006, at least some of the air is expelled from the air accumulation module that causes a liquid to exit the through hole. With one or more additional user interactions, air may enter the chamber of the air accumulation module a corresponding number of times. Further, the internal air pressure may increase such that an additional valve of the air accumulation module opens and the air is released.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable electronic device, comprising:
    an enclosure that defines an internal volume, the enclosure comprising a sidewall having first surface and a second surface opposite the first surface, the sidewall defining a through hole comprising:
        a first opening at the first surface,
        a second opening at the second surface, and
        a third opening at the second surface;
    a sensing component aligned with the second opening;
    a transparent layer coupled with the enclosure, the transparent layer and the enclosure defining an internal volume; and
    an air accumulation module positioned in the internal volume and in communication with the through hole, the air accumulation module comprising:
        a first valve configured to open and receive at least some air in the internal volume in response to a force moving the transparent layer, thereby reducing the internal volume and increasing air pressure of the air in the internal volume,
        a chamber that stores the air received by the first valve, and
        a second valve configured to open and expel the air stored in the chamber into the third opening and the first opening.

2. The wearable electronic device of claim 1, wherein:
    a first force applied to the transparent layer causes a first volume of air to enter the first valve and remain in the chamber,
    a second force, subsequent to the first force, applied to the transparent layer causes a second volume of air to enter the first valve and remain in the chamber, and
    when air pressure from at least the first volume of air and the second volume of air causes the second valve to open and at least some of the air in the chamber exits the second valve and forces a liquid out of the through hole.

3. The wearable electronic device of claim 2, wherein the first valve comprises a first one-way valve, and wherein the second valve comprises a second one-way valve.

4. The wearable electronic device of claim 1, further comprising a display assembly covered by the transparent layer, wherein the force applied to the transparent layer provides a touch input to the display assembly.

5. The wearable electronic device of claim 1, wherein the air accumulation module is aligned with the third opening, and wherein the air released from the air accumulation module exits the enclosure through the first opening.

6. The wearable electronic device of claim 1, further comprising a force detection unit capable of determining an amount of force applied to the transparent layer, wherein the force applied to the transparent layer compresses the force detection unit and reduces the internal volume from a first internal volume to a second internal volume less than the first internal volume, the second internal volume causing a corresponding increase of air pressure from a first air pressure to a second air pressure greater than the first air pressure.

7. The wearable electronic device of claim 1, further comprising:
    a first band coupled to the enclosure; and
    a second band coupled to the enclosure, wherein the first band combines with the second band to form a loop that secures the enclosure with a user.

8. A wearable electronic device, comprising:
    an enclosure that defines an internal volume, the enclosure comprising a sidewall and a through hole formed into the sidewall;
    a first band and a second band, the first band and the second band coupled to the enclosure, wherein the first band combines with the second band to form a loop that secures the enclosure with a user;
    a sensing component positioned in the internal volume and capable of determining ambient air pressure via the through hole; and
    an air accumulation module positioned in the internal volume, the air accumulation module comprising:
        a first valve configured to open in response to a first air pressure of air in the internal volume and receive at least some of the air from the internal volume,
        a chamber that stores the air received by the first valve, and a second valve configured to open in response to a second air pressure of the air and expel at least some of the air within the chamber and out of the through hole, the second air pressure greater than the first air pressure.

9. The wearable electronic device of claim 8, further comprising:
a transparent layer; and
a force detection unit positioned between, and coupled with, the transparent layer and the enclosure.

10. The wearable electronic device of claim 9, wherein:
a first force applied to the transparent layer causes a first volume of air to enter the first valve and remain in the chamber,
a second force, subsequent to the first force, applied to the transparent layer causes a second volume of air to enter the first valve and remain in the chamber with the first volume of air, and
when air pressure from at least the first volume of air and the second volume of air causes the second valve to open and at least some of the air in the chamber exits the second valve.

11. The wearable electronic device of claim 8, wherein the first valve closes at a third air pressure below the first air pressure, and wherein the second valve closes at a fourth air pressure below the second air pressure opens the second valve.

12. The wearable electronic device of claim 8, further comprising a display assembly, wherein the first air pressure is achieved in response to user interaction with the display assembly.

13. The wearable electronic device of claim 8, wherein the through hole comprises:
a first opening at a first surface of the sidewall;
a second opening at a second surface of the sidewall, the second surface opposite the first surface; and
a third opening at the second surface.

14. The wearable electronic device of claim 13, further comprising a sensing component aligned with the second opening, wherein the second valve is aligned with the third opening, and wherein the air accumulation module is configured to expel a liquid from the first opening.

15. A method for expelling a liquid from a wearable electronic device, the wearable electronic device comprising an enclosure having a through hole, the method comprising:
by the wearable electronic device:
receiving a force at a transparent layer of the wearable electronic device;
receiving air, based on receiving the force, from an internal volume, defined by the enclosure and the transparent layer, into an air accumulation module of the wearable electronic device, wherein the air comprises a first air pressure that opens a first valve of the air accumulation module; and
expelling at least some of the air from the air accumulation module through a second valve of the air accumulation module that causes the liquid to exit the through hole, wherein the second valve opens in response to a second air pressure of the air within the air accumulation module being greater than the first air pressure.

16. The method of claim 15, wherein:
providing the air into the air accumulation module comprises providing the air through the first valve, and
expelling at least some of the air from the air accumulation module comprises providing the air through the second valve such that the air passes through the through hole.

17. The method of claim 16, wherein receiving the force at the transparent layer of the wearable electronic device comprises:
applying a first force to the transparent layer, thereby causing a first volume of air to enter the first valve and remain in a chamber of the air accumulation module,
applying a second force, subsequent to the first force, to the transparent layer, thereby causing a second volume of air to enter the first valve and remain in the chamber with the first volume of air, and
when air pressure from at least the first volume of air and the second volume of air causes the second valve to open and at least some of the air in the chamber exits the second valve.

18. The method of claim 15, wherein the first valve closes at a third air pressure below the first air pressure, and wherein the second valve closes at a fourth air pressure below the second air pressure opens the second valve.

19. The method of claim 15, wherein receiving the force at the transparent layer comprises receiving a touch input to a display assembly.

20. The method of claim 15, wherein receiving the force at the transparent layer reduces the internal volume and causes a corresponding increased air pressure such that the air enters the air accumulation module.

* * * * *